(12) United States Patent
Nagashima et al.

(10) Patent No.: US 8,760,029 B2
(45) Date of Patent: Jun. 24, 2014

(54) STATOR CORE ARRANGEMENTS USING HEAT-SHRINKABLE TUBING, FOR ROTARTY ELECTRIC MACHINES

(75) Inventors: Hideaki Nagashima, Hitachi (JP); Shuichi Ishizawa, Hitachi (JP); Yuji Enomoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 12/998,285

(22) PCT Filed: Oct. 6, 2008

(86) PCT No.: PCT/JP2008/068144
§ 371 (c)(1),
(2), (4) Date: Jun. 22, 2011

(87) PCT Pub. No.: WO2010/041301
PCT Pub. Date: Apr. 15, 2010

(65) Prior Publication Data
US 2011/0273033 A1    Nov. 10, 2011

(51) Int. Cl.
*H02K 1/12* (2006.01)
*H02K 21/12* (2006.01)
*H02K 1/06* (2006.01)

(52) U.S. Cl.
USPC ............... 310/257; 310/156.66; 310/156.69; 310/216.026; 310/216.027

(58) Field of Classification Search
USPC ............... 310/49.01, 156.66, 156.69, 156.73, 310/216.026, 216.027, 257
See application file for complete search history.

(56) References Cited

U.S. PATENT DOCUMENTS

| | | | |
|---|---|---|---|
| 2006/0152092 A1 | 7/2006 | Kim et al. | |
| 2006/0175927 A1 | 8/2006 | Yoshida | |
| 2008/0018195 A1 | 1/2008 | Kitamura et al. | |
| 2008/0018196 A1 | 1/2008 | Enomoto et al. | |

FOREIGN PATENT DOCUMENTS

| | | | |
|---|---|---|---|
| JP | 11-341717 | | 12/1999 |
| JP | 2001-218429 | | 8/2001 |
| JP | 2003088013 A | * | 3/2003 |
| JP | 2004-215420 | | 7/2004 |
| JP | 2006-197787 | | 7/2006 |
| JP | 2006-217760 | | 8/2006 |
| JP | 2007-060858 | | 3/2007 |
| JP | 2007-295740 | | 11/2007 |
| JP | 2008-029141 | | 2/2008 |
| JP | 2008-029142 | | 2/2008 |
| JP | 2008-061319 | | 3/2008 |

OTHER PUBLICATIONS

Machine Translation JP2003088013 (2003).*

* cited by examiner

*Primary Examiner* — Tran Nguyen
*Assistant Examiner* — Jose Gonzalez Quinone
(74) *Attorney, Agent, or Firm* — Antonelli, Terry, Stout & Kraus, LLP.

(57) ABSTRACT

A rotary electric machine having a stator whose dismantled structure can be reintegrated at reduced cost. The stator eliminates difficulties in separation and reuse at the time of disposal incident to use of molding such as resin molding. Also, it has no adverse environmental impacts.

A plurality of stator cores having a plurality of magnetic poles arranged at intervals in the circumferential direction are laminated in the axial direction with use of a heat-shrinkable tube having an appropriate compression retention force. The outer circumferences of these stator cores are covered collectively with another heat-shrinkable tube. The heat-shrinkable tubes are heated so that the plurality of stator cores are integrated into a single-piece structure by the heat-shrunk tubes.

12 Claims, 9 Drawing Sheets

STATOR CORE ARRANGEMENTS USING HEAT-SHRINKABLE TUBING, FOR ROTARY ELECTRIC MACHINES

FIELD OF THE INVENTION

The present invention relates to rotary electric machines having a segmented stator with a coil wound on the inner surface of its core to form magnetic poles.

BACKGROUND OF THE INVENTION

Conventionally, in order to facilitate maintenance, there have been attempts to divide the stator of a rotary electric machine into segments and reassemble the stator segments into an integral structure after coil winding.

For example, as is disclosed in Japanese Patent Laid-open No. 2008-29141 and Japanese Patent Laid-open No. 2008-29142, a claw teeth rotary electric machine has a multi-phase stator core formed by laminating a plurality of single-phase disc-like stator cores in the axial direction such that their magnetic pole phases are electrically shifted. Each of the disc-like stator cores is formed by inserting a ring-like coil between two disc-like cores having claw poles facing each other.

Also, as a conventional technique related to a common segmented structure of a stator core, examples of separating a yoke from teeth to facilitate coil assembly and coupling tooth tips after coil assembly are disclosed in many documents, such as Japanese Patent Laid-open No. 2001-218429.

Additionally, a technique of dividing a yoke into as many segments as the number of teeth in the circumferential direction to divide a stator core into segments each having a yoke segment and a tooth and forming one pole is disclosed in documents including the above-mentioned Japanese Patent Laid-open No. 2001-218429.

Meanwhile, Japanese Patent Laid-open No. 2007-295740 discloses an example of cylindrically combining a plurality of segmented cores formed by integrating laminated magnetic steel sheets divided into as many segments as the number of poles in the circumferential direction, wrapping a magnetic steel wire and a prepreg sheet impregnated with thermosetting resin around the outer circumferences of the cores, heat-curing the sheet, and accommodating the cores into a housing.
Japanese Patent Laid-open No. 2008-29141
Japanese Patent Laid-open No. 2008-29142
Japanese Patent Laid-open No. 2001-218429
Japanese Patent Laid-open No. 2007-295740

SUMMARY OF THE INVENTION

Unfortunately, the conventional techniques described above have disadvantages including extra cost required to reintegrate a segmented or dismantled structure, and difficulties in separation and reuse at the time of disposal and adverse environmental impacts incident to use of molding such as resin molding or adhesive bonding.

The present invention has been made in view of the above-described problems and is directed at providing a rotary electric machine having a stator whose segmented structure can be reintegrated at low cost and whose materials, are easy to separate at the time of disposal and therefore easy to reuse and eco-friendly.

According to the present invention, a rotary electric machine has a stator formed by laminating stator cores, covering the outer circumferences thereof with a heat-shrinkable tube, and heating the heat-shrinkable tube so that the stator cores are integrated into a single-piece structure by the heat-shrunk tube.

Here, the heat-shrinkable tube is a tube sold under trade names such as "heat-shrinkable tube", "thermal contractible tube", and "shrink tube". When this tube of a required width is placed to cover the outer circumferences of the stator cores and heated up to a temperature of 115° C. or higher, it can hold the outer circumferences of the stator cores tightly by shrinking at a heat shrinkage ratio of 35% or greater in the radial direction. HISHITUBE, a commercially available polyvinyl chloride heat shrinkable tube manufactured by Mitsubishi Plastics, Inc., has excellent mechanical properties. Also, Sumitube, an electron beam cross-linking polyolefin resin manufactured by Sumitomo Electric Fine Polymer, Inc., or Nishi-Tube, an ethylene-propylene rubber manufactured by Nishi Nippon Electric Wire & Cable Co., Ltd., not only has satisfiable mechanical properties but also exhibits environmentally excellent properties at the time of disposal.

The heat-shrinkable tube used in a preferred embodiment of the present invention has a heat shrinkage ratio of 35% or greater in the radial direction, as described above. The heat-shrinkable tube can sufficiently hold many stator components separated in the circumferential direction and laminated in the axial direction by shrinking and adhering to the cylindrical surface of the outer circumferences of the stator cores. However, the tube is not completely joined to the surface of the stator cores as it would with use of molding or adhesive bonding. Therefore, at the time of maintenance or disposal, the stator can be easily dismantled by cutting the heat-shrinkable tube.

Additionally, the stator core is formed by sandwiching a ring-like coil between two stator cores having claw poles facing each other and covering the outer circumferences of the stator cores with a heat-shrinkable tube so that the stator cores are integrated into a single-piece structure by the heat-shrunk tube.

Also, objects of complicated shapes such as the two stator cores having claw poles facing each other can be easily formed as powder compacts.

Each of the stator cores may also be formed by sandwiching a nonmagnetic ring and a ring-like coil on the outer circumference of the claw poles facing each other between two stator cores and covering the outer circumferences of the stator cores with a heat-shrinkable tube so that the stator cores are integrated into a single-piece structure by the heat-shrunk tube.

Moreover, each of the stator cores may be formed by inserting a nonmagnetic ring on the inner circumference of the claw poles facing each other, sandwiching a heat-shrinkable tube and a ring-like coil on the outer circumference of the claw poles facing each other between two stator cores, and covering the outer circumferences of the stator cores with a heat-shrinkable tube so that the stator cores are integrated into a single-piece structure by the heat-shrinkable tubes and the nonmagnetic ring disposed at two internal and external locations.

Furthermore, each of the stator cores may be formed by inserting a ring made of shape-memory resin or nonmagnetic shape-memory alloy which expands by the application of heat on the inner circumference of the claw poles facing each other, sandwiching a nonmagnetic ring and a ring-like coil on the outer circumference of the claw poles, and covering the outer circumferences of the stator cores with a heat-shrinkable tube so that the stator cores are integrated into a single-piece structure by the heat-shrinkable tube and the shape-memory resin or shape-memory alloy disposed at two internal and external locations. Shape-memory alloy and shape-memory resin differ in property: shape-memory alloy cures as it recovers its original shape when heated, while shape-memory resin cures (in a glass state) at low temperature and softens (in a rubber state) when heated.

Shape-memory resins currently on the market include Norsorex, a polynorbornene resin manufactured by Zeon Corporation; Kuraray TPI, a trans-polyisoprene resin manufactured by Kuraray Co., Ltd.; ASMER, a styrene-butadiene copolymer resin manufactured by Asahi Kasei Corporation; and DiAPLEX, a polyurethane resin manufactured by Mitsubishi Heavy Industries, Ltd. NT alloys, based on nickel and titanium, are widely used and readily available as shape-memory alloys, and data on their material properties are also readily available.

According to another aspect of the present invention, a rotary electric machine has a stator formed by assembling a segmented cylindrical stator core of conventional structure, covering the outer circumference of the stator core with a heat-shrinkable tube, and heating the heat-shrinkable tube so that the stator core is integrated into a single-piece structure by the heat-shrunk tube.

Also, the stator may be formed by separating teeth from the stator core, inserting a ring made of shape-memory resin or nonmagnetic shape-memory alloy which expands by the application of heat on the side of the inner circumference of the teeth, and applying heat to the ring to apply compression stress to the teeth in the radial direction so that the segmented stator core and the teeth are integrated into a single-piece structure.

According to a preferred embodiment of the present invention, there can be provided a rotary electric machine whose laminated and segmented stator cores are integrated, wherein the stator cores can be manufactured at significantly reduced cost and are easy to separate and reuse at the time of disposal.

According to another preferred embodiment of the present invention, the cost required to dismantle and reintegrate the stator of a rotary electric machine can be reduced, and problems such as adverse environmental impacts can be solved by eliminating difficulties in separation and reuse at the time of disposal incident to use of molding such as resin molding or adhesive bonding.

Other objects and features of the present invention will be disclosed in the embodiments described hereinafter.

LEGEND 11, 12/stator core
111, 121/claw pole
2/coil
3/ring made of nonmagnetic alloy or hard rubber resin
4, 5, 6, 61/heat-shrinkable tube
100/assembly jig
101/base
102/column
103/tube support disc
104/bottom support disc
105/top support disc
106/holding nut
62, 63/small hole
64, 65/incision
7/rotor
81, 82/bracket
9/bracket mounting bolt
10/nut
13/ring made of nonmagnetic-alloy or hard rubber resin
14/ring made of shape-memory resin or nonmagnetic shape-memory alloy
15/stator core
16/teeth
17/stator
18/teeth support ring
181/ring portion
182/projecting portion
19/heat-shrinkable tube

DESCRIPTION OF THE PREFERRED EMBODIMENTS

Preferred embodiments of the present invention will be described hereinafter with reference to the accompanying drawings.

Embodiment 1

Figure 1:
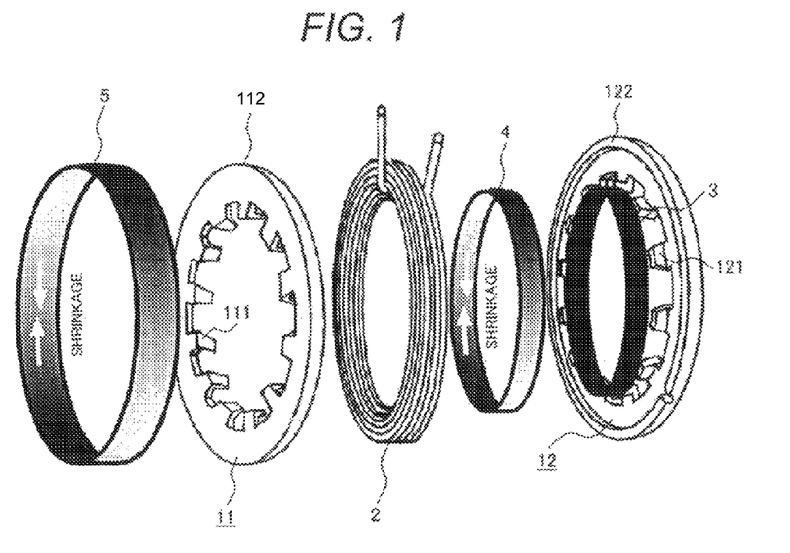
FIG. 1 is an exploded perspective view showing the structure of a single-phase stator of a rotary electric machine in accordance with a first embodiment of the present invention.

FIG. 1 is an exploded perspective view showing the structure of a single-phase stator of a claw teeth rotary electric machine in accordance with the first embodiment of the present invention. A pair of disc-like cores 11 and 12 each having a large hollow portion are disposed coaxially such that they face each other, and many claw poles (claw teeth) 111 and 121 are provided such that the claw poles of one disc-like core stick out in the axial direction from near the inner circumference thereof toward the other disc-like core. These many claw poles 111 and 121 are arranged in the circumferential direction at regular intervals such that the claw poles of one disc-like core are positioned in the intervals between the claw poles of the other disc-like core when the disc-like cores 11 and 12 come into contact with each other. Also, on the outermost circumferences of both disc-like cores are provided with outer edges 112 and 122 which are L-shaped in cross section in the axial direction and are half as high as the claw poles 111 and 121. Therefore, when the disc-like cores 11 and 12 come into contact with each other, an annular gap appears between the claw poles 111 and 121 and the outer edges 112 and 122. A ring-like coil 2 is sandwiched in this annular gap.

Described above are basic components essential for the single-phase stator of a claw teeth rotary electric machine in accordance with the present embodiment. A three-phase stator for a three-phase rotary electric machine is formed by coaxially laminating three stators of the same structure as this such that the phases of their claw poles are electrically shifted 120 degrees from one another.

Here, in the first embodiment of the present invention, the pair of disc-like cores 11 and 12, which have claws and therefore are complicated in shape, can be easily formed as non-sintered powder compacts formed by compacting magnetic powder. The disc-like cores 11 and 12 thus formed are excellent in magnetic property. However, the cluster of claw poles 111 and 121 formed as non-sintered powder compacts are relatively weak. Therefore, a ring 3 made of nonmagnetic alloy or hard rubber resin, which is mechanically strong, is inserted such that it is in contact with the inner circumference of the cluster of combined claw poles 111 and 121 to support the cluster of claw poles 111 and 121. Moreover, the outer circumference of the cluster of claw poles 111 and 121 is covered with a heat-shrinkable tube 4, which is heated so that the relatively weak cluster of claw poles 111 and 121 is supported by the mechanically strong ring 3.

Meanwhile, the pair of disc-like cores 11 and 12 are brought into contact with each other with the coil 2 accommodated between them. As a result, the outer edges 112 and 122 form a cylindrical shape. The outer edges 112 and 122 are covered with a heat-shrinkable tube 5, to which heat is applied so that the outer edges 112 and 122 are fixed by the shrinkage of the heat-shrinkable tube 5.

Figure 2:
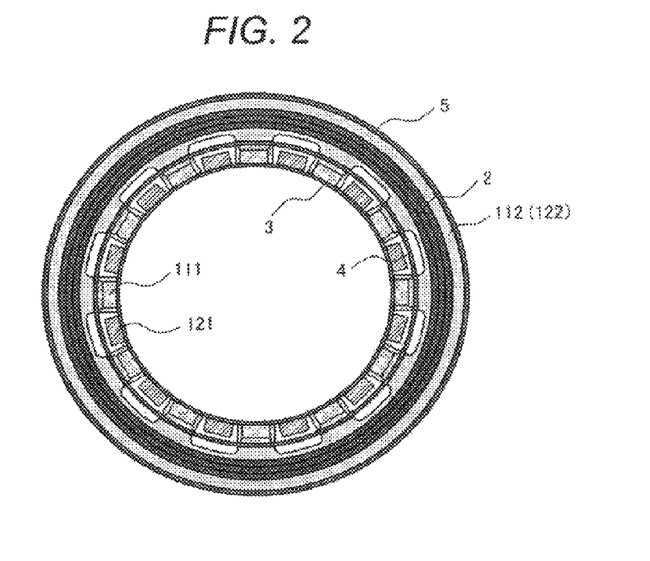
FIG. 2 is a cross-sectional view of a single-phase stator of a rotary electric machine in accordance with a first embodiment of the present invention.

FIG. 2 is a cross-sectional view of the single-phase stator of a claw teeth rotary electric machine described with reference to FIG. 1 in accordance with the first embodiment of the present invention, when viewed in the axial direction after assembly.

As shown by FIG. 2, the cluster of claw poles 111 and 121 is supported by the mechanically strong ring 3 made of non-magnetic alloy or hard rubber resin from inside. Also, the shrinkage of the heat-shrinkable tube 4 makes the mechanically strong ring 3 to support the relatively weak cluster of claw poles 111 and 121 from the outer circumference of the cluster of claw poles 111 and 121.

FIG. 2 also shows that the outer edges 112 and 122, forming a cylindrical shape after the pair of disc-like cores 11 and 12 are brought into contact with each other with the coil 2 accommodated between them, are fixed by the shrinkage of the heat-shrinkable tube 5 provided around them.

As described above, the pair of disc-like cores 11 and 12 is fixed at two locations by the heat-shrinkable tubes 4 and 5 so that they are integrated into a single-piece structure.

Figure 3:
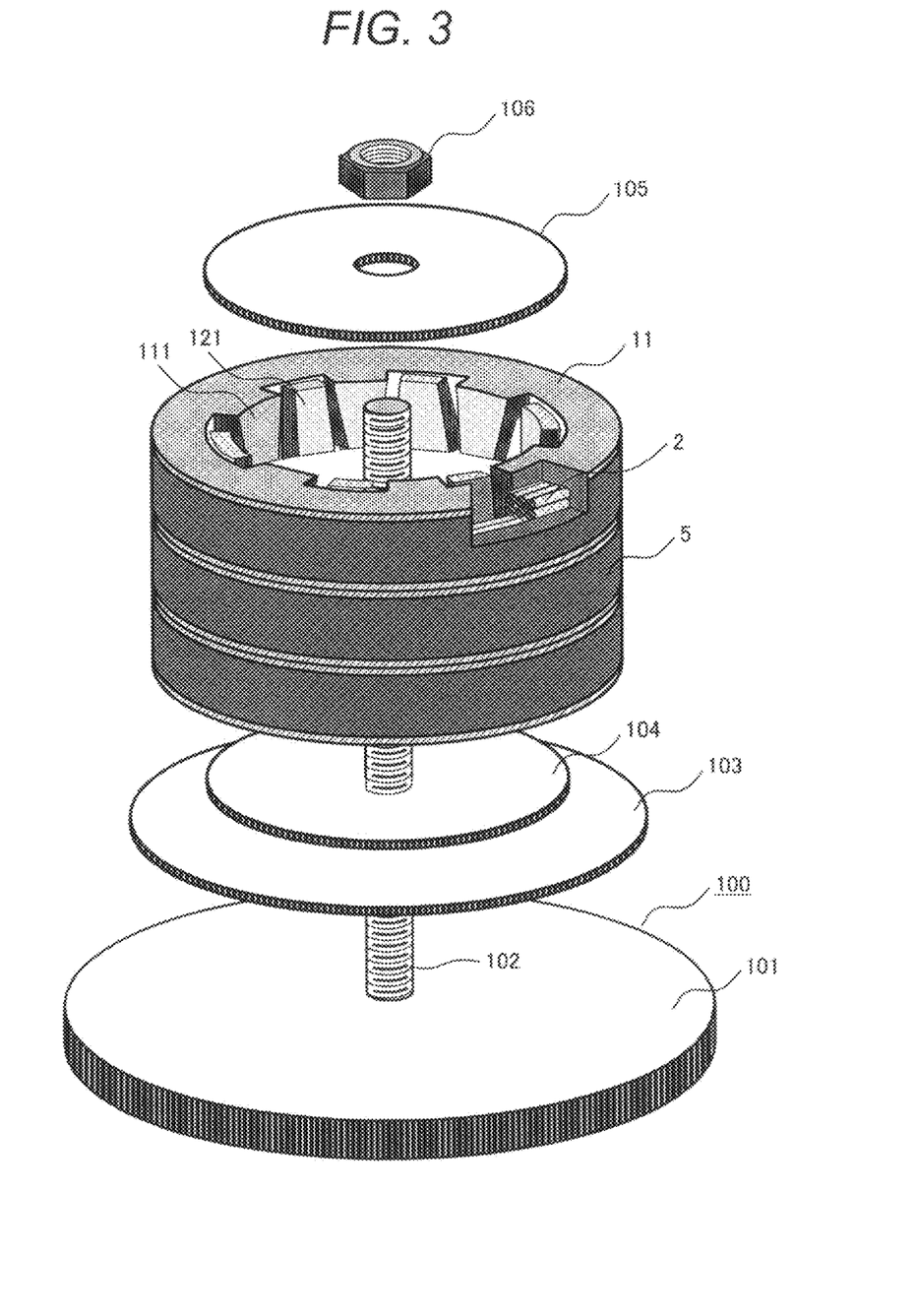
FIG. 3 is a partial exploded perspective view showing a stator of a rotary electric machine together with an assembly jig at a preparatory step for integrating the stator with use of a heat-shrinkable tube in accordance with a first embodiment of the present invention.

FIG. 3 is a partial exploded perspective view showing a stator of a claw-teeth three-phase rotary electric machine together with an assembly jig at a preparatory step for integrating the stator with use of a heat-shrinkable tube in accordance with the first embodiment of the present invention.

The assembly jig 100 includes a base 101 and a threaded column 102 provided vertically thereon. First, a tube support disc 103 is inserted from the top of this column 102 and properly positioned. Next, a bottom support disc 104 is inserted and positioned similarly such that a proper distance from the tube support disc 103 is maintained.

Then, three of the single-phase stator illustrated in FIG. 2 are stacked on the bottom support disc 104 such that their magnetic poles are electrically shifted 120 degrees from one another. Then, the stators are fastened by a holding nut 106 via a top support disc 105.

Figure 4:
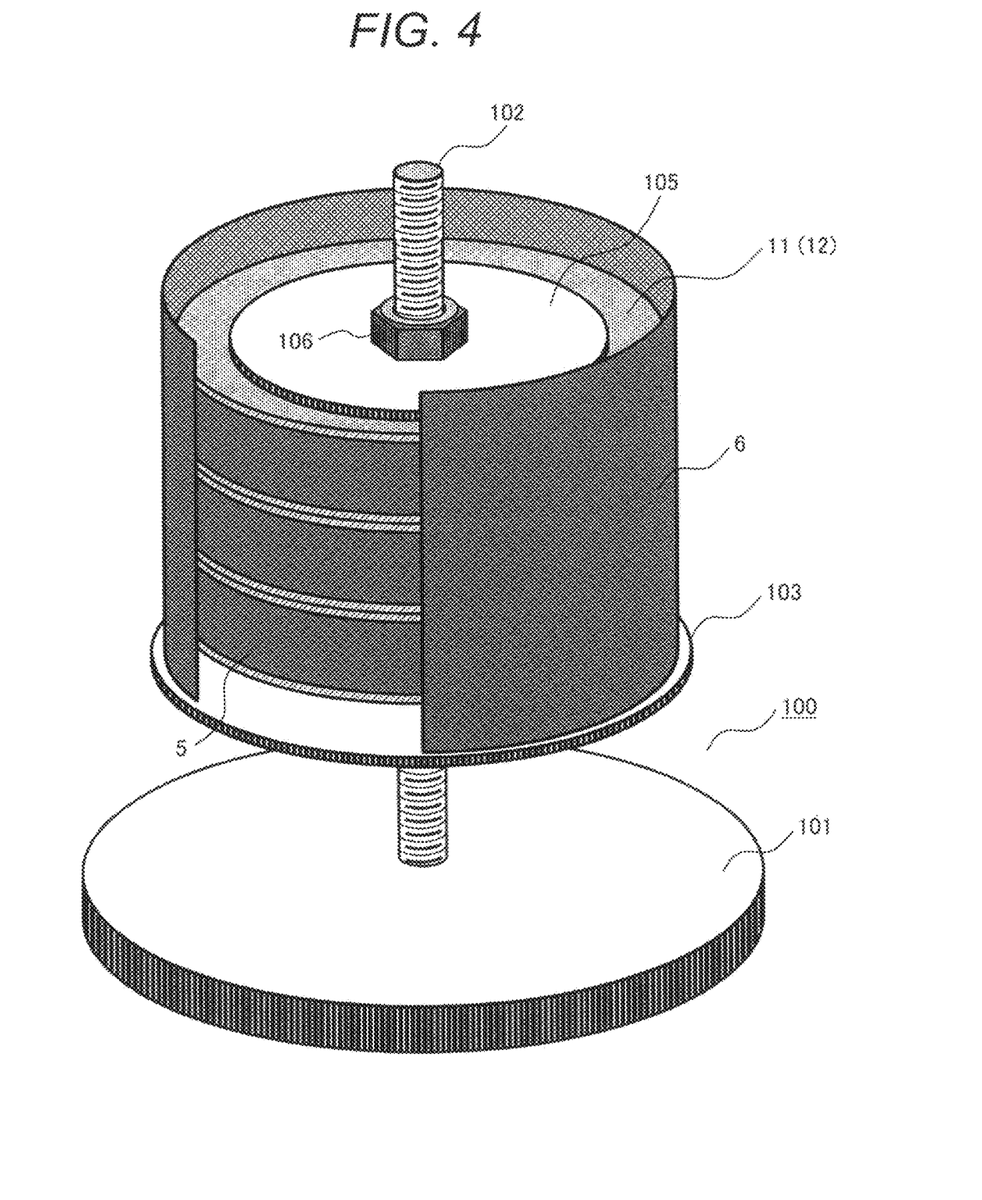
FIG. 4 is a partial exploded perspective view showing a stator of a rotary electric machine together with an assembly jig at a stage prior to the application of heat to integrate the stator with use of a heat-shrinkable tube in accordance with a first embodiment of the present invention.

FIG. 4 is a partial exploded perspective view showing the stator of a claw-teeth three-phase rotary electric machine together with an assembly jig at a stage prior to the application of heat to integrate the stator with use of a heat-shrinkable tube in accordance with the first embodiment of the present invention.

FIG. 4 shows the state of the three-phase stator fixed and covered on its periphery with a heat-shrinkable tube 6. In this drawing, a part of the heat-shrinkable tube 6 has been cut away to reveal the inside. The width of the heat-shrinkable tube 6 (in the vertical direction of the drawing) is determined based on the shrinkage in the width direction and the area covering the outer circumferential parts of both ends of the stator core. Therefore, the distance from the bottom support disc 104 to the support disc 103 for the heat-shrinkable tube 6 (in the height direction) is determined such that the parts of the heat-shrinkable tube 6 which extend out over the top and bottom ends of the stator core are equal in length.

After positioning is done in this manner, heat is applied so that the heat-shrinkable tube 6 shrinks.

Figure 5:
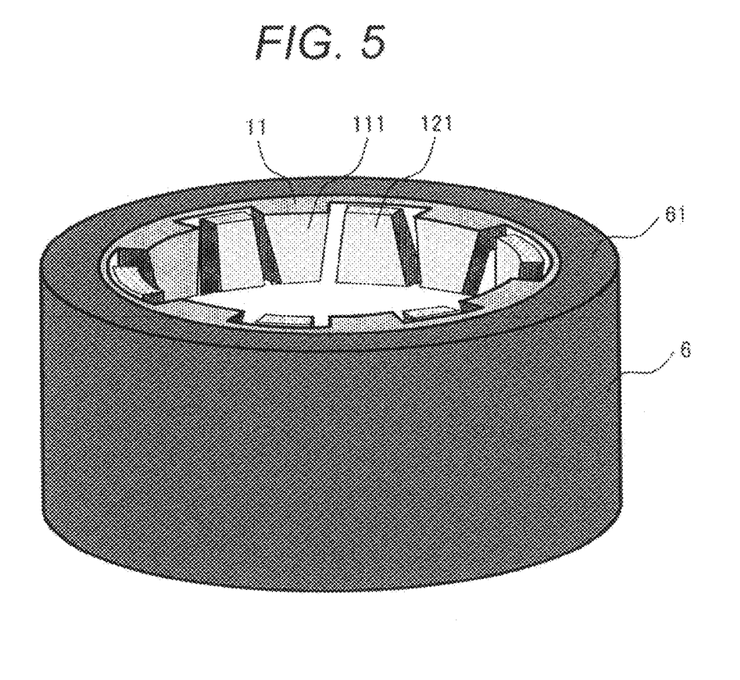
FIG. 5 is a perspective view of a stator of a rotary electric machine integrated with use of a heat-shrinkable tube in accordance with a first embodiment of the present invention.

FIG. 5 is a perspective view of the stator of a claw-teeth three-phase rotary electric machine integrated with use of a heat-shrinkable tube in accordance with the first embodiment of the present invention.

As shown in FIG. 5, the stator of a three-phase rotary electric machine, including not only its cylindrical outer circumference, but also the part designated by the reference numeral 61, whose width varies depending on the length of the parts extending out over the top and bottom ends of the stator core in FIG. 4, is neatly and securely covered with the heat-shrinkable tube 6 (including the part 61).

As described above, by covering the outer circumference of the three-phase stator having the cluster of claw poles 111 and 121 with the heat shrinkable tubes 6 and 61, the stator is integrated.

Therefore, a method for making a stator in the present embodiment, a step of cutting the heat-shrinkable tube 6 such that the tube is wider than the width of the outer circumference of the stator cores for three phases, and a step of covering the stator cores for three phases with the heat-shrinkable tube 6 such that the tube extends out over the top and bottom ends of the stator cores (FIG. 4) are provided. Then, by adding a step of applying heat to the heat-shrinkable tube 6 extending out over both ends of the outer circumference of the stator cores, the stator of a rotary electric machine closely covered not only on its circumferential part 6, but also on the part 61 at both ends can be provided.

FIGS. 3 and 4 illustrate the case in which three of the single-phase stator already covered with the heat-shrinkable tube 5 are laminated for three phases and further covered with the heat-shrinkable tube 6. However, one should not stick to this. The heat-shrinkable tube 5 in FIG. 1 may be omitted, and the three stators for three-phases, each stator being uncovered with the heat-shrinkable tube 5 in FIG. 4, may be stacked on the jig 100 in FIG. 3 and covered collectively with the heat-shrinkable tube 6. Which configuration to adopt may be selected according to the relationship between the workability and the strength required of the finished piece.

Figure 6:
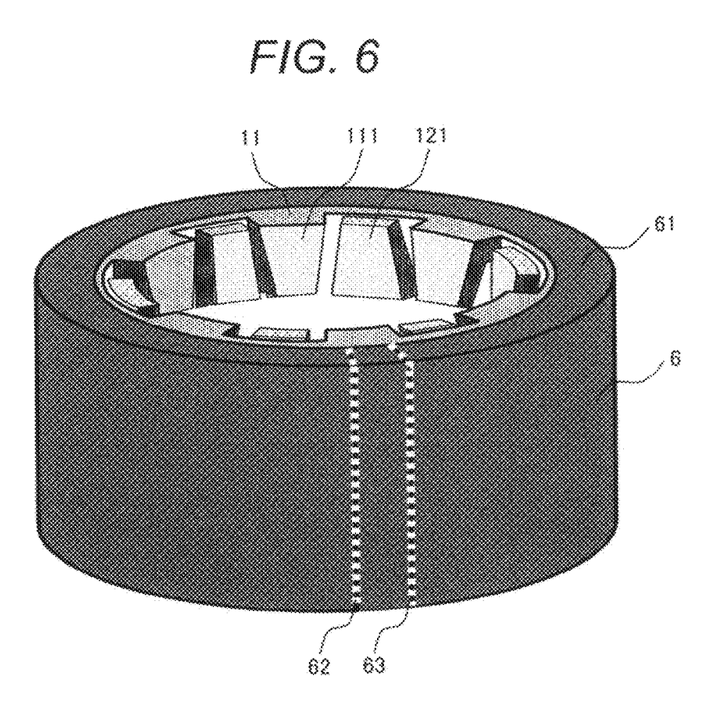
FIG. 6 is a perspective view illustrating the status of a stator with series of numerous small holes drilled on two straight lines in a heat-shrinkable tube before or after being integrated with use of the heat-shrinkable tube in accordance with a first embodiment of the present invention.

FIG. 6 is a perspective view illustrating the status of a stator with numerous small holes 62 and 63 drilled in series on two straight lines in the heat-shrinkable tubes 6 and 61 after being integrated with use of the heat-shrinkable tube 6 in accordance with the first embodiment of the present invention. The numerous small holes 62 and 63 are drilled on two lines in the length direction so that the heat-shrinkable tubes 6 and 61 can be easily ruptured when the dismantlement of the stator is necessary, at the time of disposal for example.

In this case, the strength of the heat-shrinkable tubes 6 and 61 has been significantly reduced, and tests or the like need to be conducted to prove that there is no problem in their strength under actual service conditions.

Figure 7:
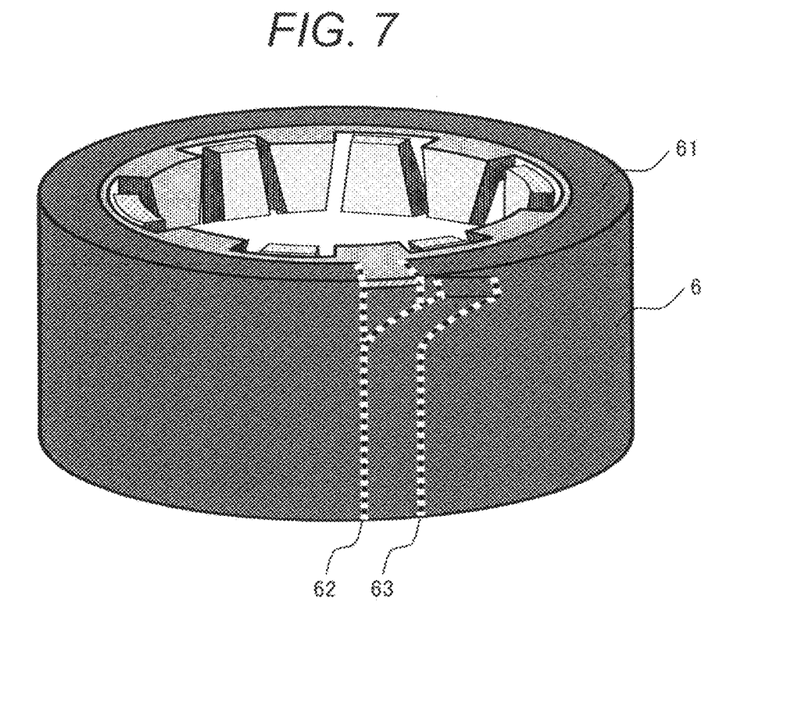
FIG. 7 is a perspective view illustrating the function of series of numerous small holes on two straight lines in a heat-shrinkable tube after a stator is integrated with use of the heat-shrinkable tube in accordance with a first embodiment of the present invention.

FIG. 7 is a perspective view illustrating the function of numerous small holes provided in series on two straight lines in a heat-shrinkable tube after a stator is integrated with use of the heat-shrinkable tube in accordance with the first embodiment of the present invention. The drawing shows the state of the small holes already starting to rapture from the top end at the time of dismantlement.

Figure 8:
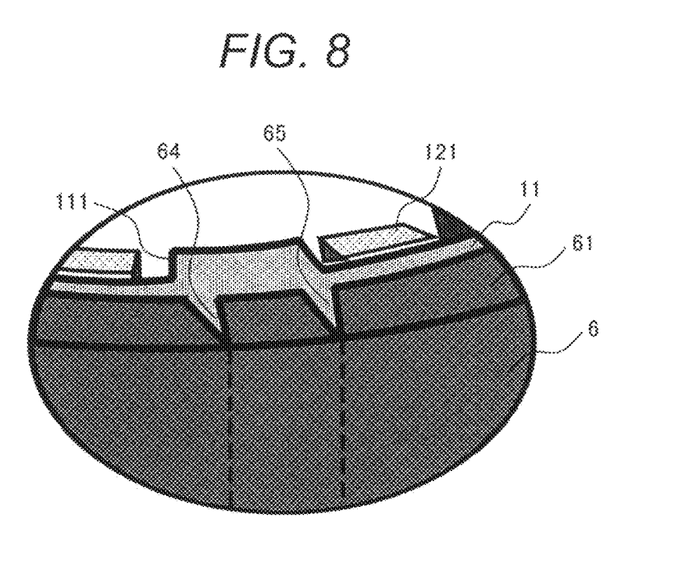
FIG. 8 is a perspective view illustrating incisions provided at an edge of a heat-shrinkable tube to facilitate the dismantlement of a stator after being integrated with the heat-shrinkable tube in accordance with a first embodiment of the present invention.

FIG. 8 is a perspective view illustrating incisions provided at an edge of a heat-shrinkable tube to facilitate the dismantlement of a stator before or after being integrated with the heat-shrinkable tube in accordance with the first embodiment of the present invention.

As shown in the drawing, incisions 64 and 65 are provided at an edge of the heat-shrinkable tube 61 so that, by making shallow slits along the broken lines with a cutter or the like, the heat-shrinkable tube 6 can be easily ruptured when the stator is actually dismantled.

Figure 9:
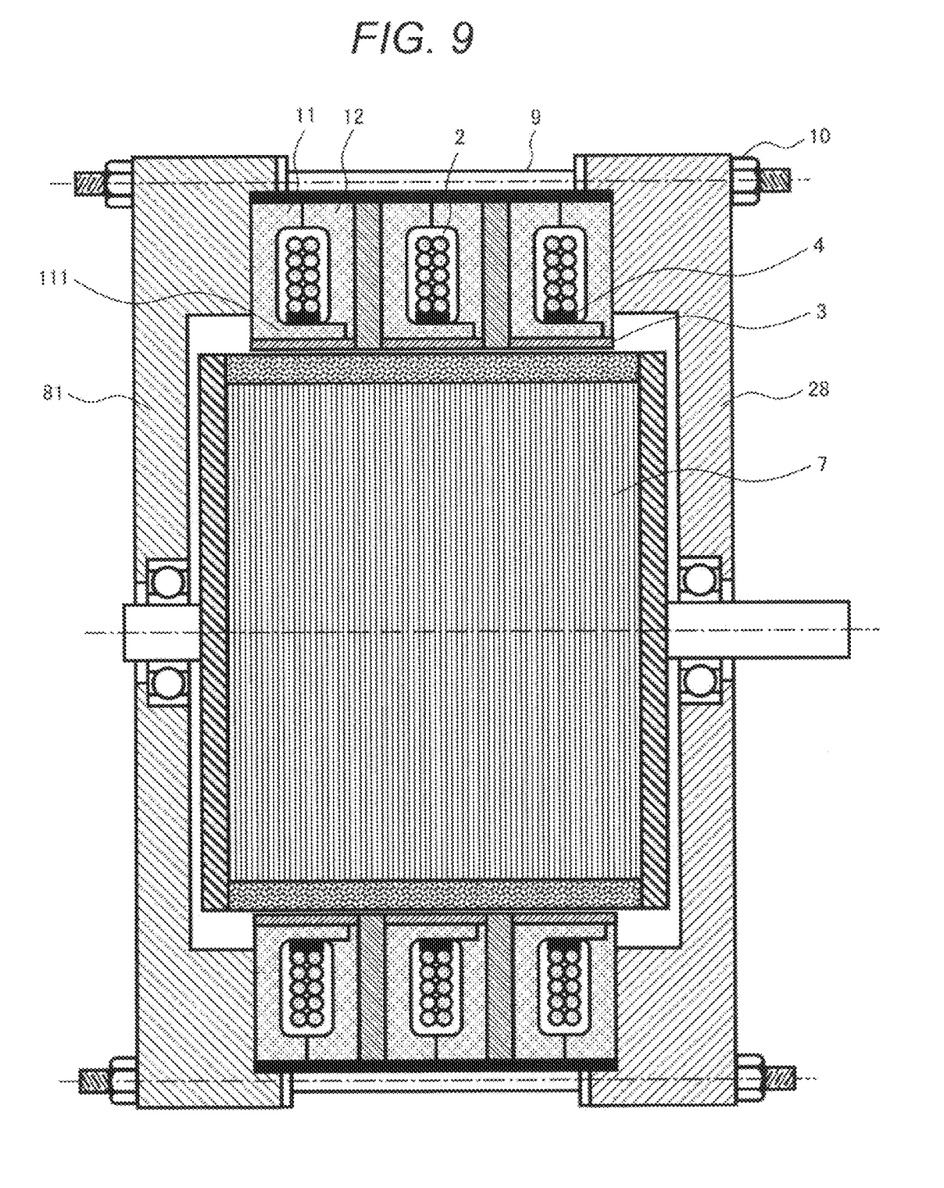
FIG. 9 is a longitudinal sectional view of a claw teeth rotary electric machine in accordance with a first embodiment of the present invention.

FIG. 9 is a longitudinal sectional view of a claw teeth rotary electric machine in accordance with the first embodiment of the present invention.

The claw poles 111 and 121 of the two stator cores 11 and 12 having the claw poles 111 and 121 facing each other are alternately combined, the ring 3 is brought into contact with the inner circumference of the cluster of these claw poles 111 and 121, and the stator cores 11 and 12 are fixed with the heat-shrinkable tube 4 from the outer circumference of the cluster of claw poles 111 and 121. The ring-like coil 2 is sandwiched on the outer circumference of this heat-shrinkable tube 4, and heat is applied to combine the two stator cores 11 and 12. This is a stator core for a single phase, and three of this single-phase stator core are laminated coaxially, and the outer circumferences of them are fixed with the heat-shrinkable tube 6 so that the stator cores for three phases are integrated.

The three-phase stator core thus formed is sandwiched between brackets 81 and 82 together with a rotor 7 and fixed by coupling the brackets 81 and 82 with a bracket mounting bolt 9 and a nut 10. Here, as shown in the drawing, the outer circumference of the three-phase stator core is fixed with the heat-shrinkable tube 6, and there is no housing on its outside.

According to the present embodiment, the structure as shown in the drawing is possible, and there can be provided a rotary electric machine for which a casing can be omitted.

Embodiment 2

Figure 10:
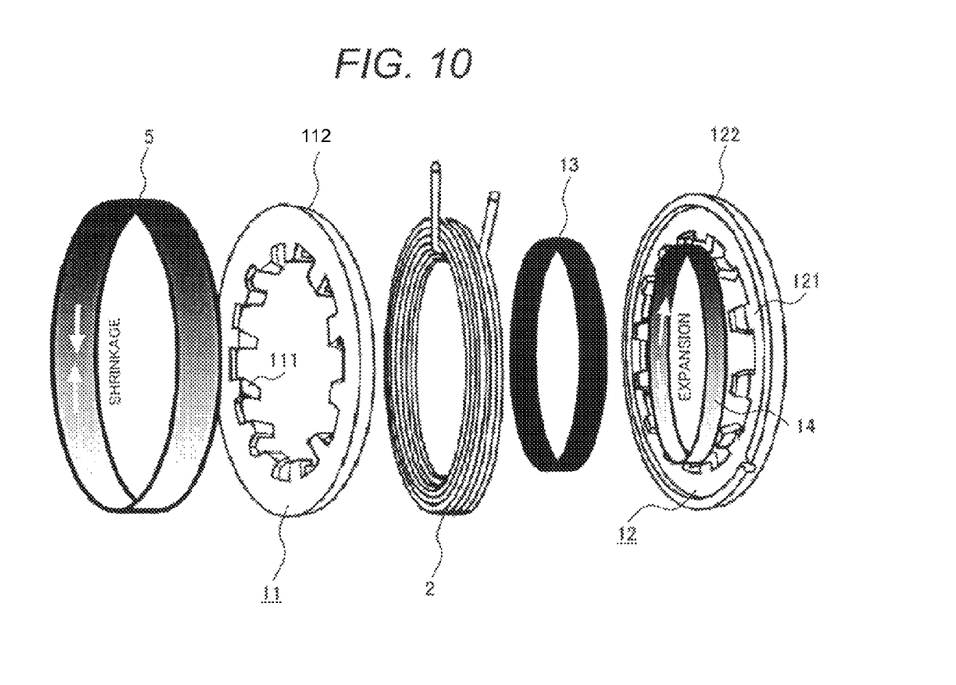
FIG. 10 is an exploded perspective view showing the structure of a single-phase stator of a rotary electric machine in accordance with a second embodiment of the present invention.

FIG. 10 is an exploded perspective view showing the structure of a single-phase stator of a rotary electric machine in accordance with the second embodiment of the present invention. Elements similar to those in the embodiment shown in FIG. 1 will not be described in detail, and different elements will be mainly described.

In the above-described first embodiment of the present invention, the relatively weak cluster of claw poles 111 and 121 constricted by the heat-shrinkable tube 4 from the outer circumference thereof is supported by the mechanically strong ring 3 in contact with the inner circumference of the cluster of claw poles 111 and 121.

By contrast, in the second embodiment shown in FIG. 10, a cluster of claw poles 111 and 121 is fixed by a mechanically strong ring 13 made of nonmagnetic alloy or hard rubber resin on its outer circumferential side, and a ring 14 made of shape-memory resin or nonmagnetic shape-memory alloy is disposed on the inner circumference of the cluster of claw poles 111 and 121. The shape-memory ring 14 expands by the application of heat, and the relatively weak cluster of claw poles 111 and 121 is held by the mechanically strong ring 13. The ring 13 made of nonmagnetic alloy or hard rubber resin in this embodiment can also fulfill a function to protect a coil disposed around it against damage.

Figure 11:
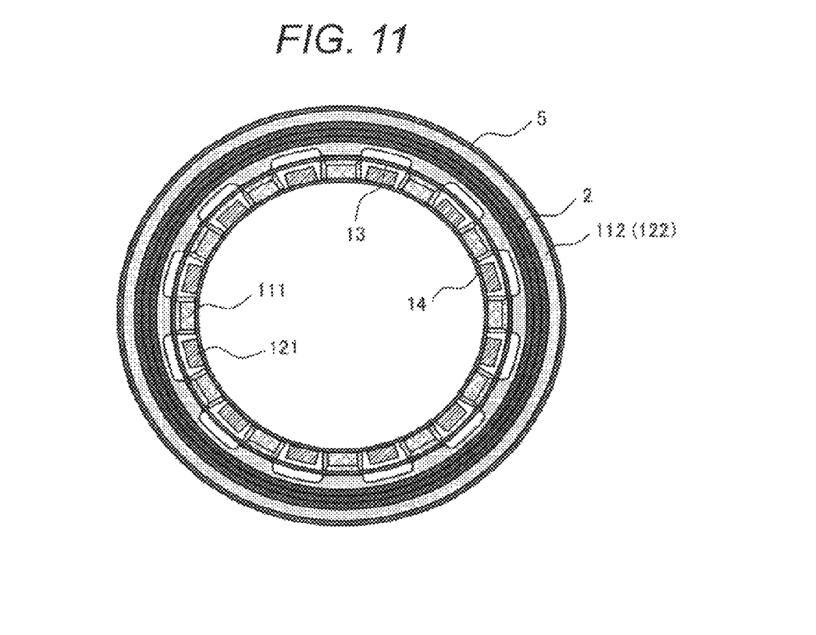
FIG. 11 is a cross-sectional view of a single-phase stator of a rotary electric machine in accordance with a second embodiment of the present invention.

FIG. 11 is a cross-sectional view of the single-phase stator of a claw teeth rotary electric machine described with reference to FIG. 10 in accordance with the second embodiment of the present invention, when viewed in the axial direction after assembly.

As shown by FIG. 11, the relatively weak cluster of claw poles 111 and 121 is supported such that it is pressed against the mechanically strong ring 13 in contact with its outer circumference by the expansion of the ring 14 of shape-memory resin or nonmagnetic shape-resin alloy. As in the first embodiment, cylindrical outer edges 112 and 122 are secured by the shrinkage of a heat-shrinkable tube 5.

As described above, a pair of disk-like cores 11 and 12 are fixed at two locations by the ring 14 made of shape-memory resin or nonmagnetic shape-memory alloy and the heat-shrinkable tube 5 so that they are integrated into a single-piece structure.

Embodiment 3

Figure 12:
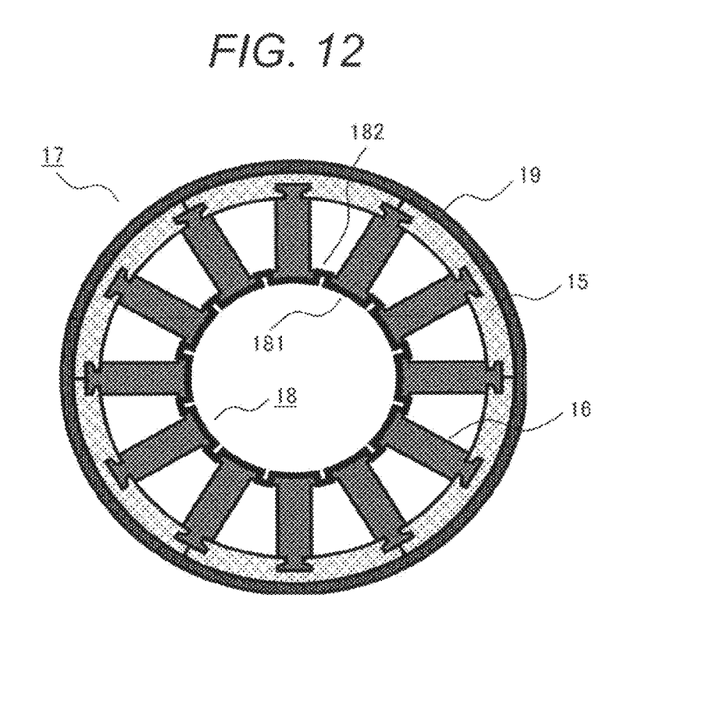
FIG. 12 is a cross-sectional view of a stator of a rotary electric machine in accordance with a third embodiment of the present invention.

FIG. 12 is a cross-sectional view of a stator of common structure of a rotary electric machine in accordance with the third embodiment of the present invention.

In this third embodiment, a stator 17 has a cylindrical stator core 15 and teeth 16. The stator core 15 and teeth 16 are each divided into six segments. A coil is wound on each of the teeth 16 (not shown in the drawing). In this stator 17, a teeth support ring 18 made of shape-memory resin or nonmagnetic shape-memory alloy is inserted on the inner circumferential side of the teeth 16. The teeth support ring 18 has a ring portion 181 and projecting portions 182 and expands by the application of heat. After the segmented stator core 15 and teeth 16 are assembled, the outer circumference of the stator core 15 is covered with a heat-shrinkable tube 19, and heat is applied so that compression stress is applied to the stator core 15 in the circumferential direction by the heat-shrinkable tube 19. Meanwhile, compression stress is applied to the teeth 16 in the radial direction by the ring portion 181 of the teeth support ring 18, and in the circumferential direction by the projecting portions 182. As a result, the segmented stator core 15 and teeth 16 are integrated into a single-piece structure.

Embodiment 4

Figure 13:
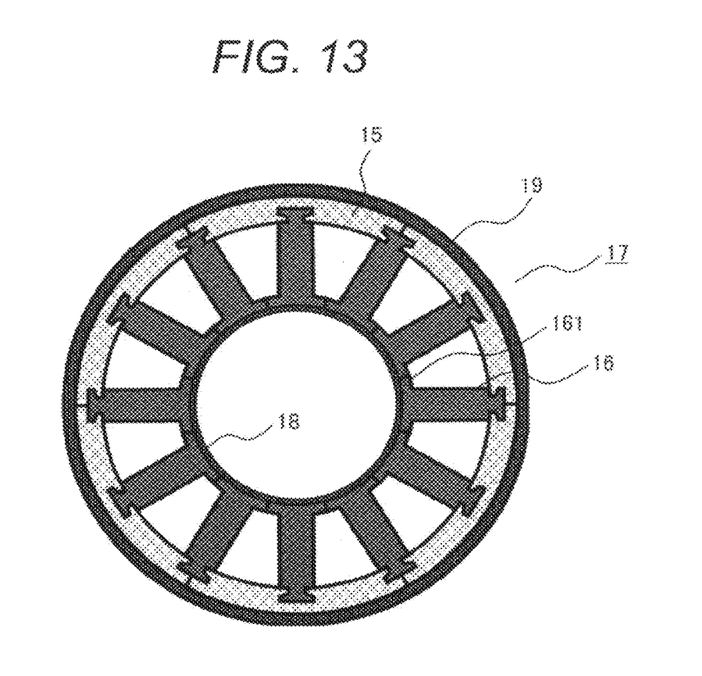
FIG. 13 is a cross sectional view of a stator of a rotary electric machine in accordance with a fourth embodiment of the present invention.

FIG. 13 is a cross-sectional view of a stator of common structure of a rotary electric machine in accordance with the fourth embodiment of the present invention.

Also in this fourth embodiment, a stator 17 has a cylindrical stator core 15 and teeth 16, both of which are divided into segments. A coil is wound on each of the teeth 16 (not shown in the drawing). In this stator 17, after the segmented stator core 15 and teeth 16 are assembled, the outer circumference of the stator core 15 is covered with a heat-shrinkable tube 19, and a teeth support ring 18 made of shape-memory resin or nonmagnetic shape-memory alloy is inserted on the inner circumferential side of the teeth 16. Then the heat-shrinkable tube 19 is heated so that compression stress is applied to the stator core 15 in the circumferential direction by the heat-shrinkable tube 19, while compression stress is applied to the teeth 16 in the radial direction. As a result, the segmented stator core 15 and teeth 16 are integrated into a single-piece structure. In this case, the position of each of the teeth 16 is determined by projecting portions 161 provided at both ends of each of the teeth 16 on the inner circumferential side thereof.

Embodiment 5

Figure 14:
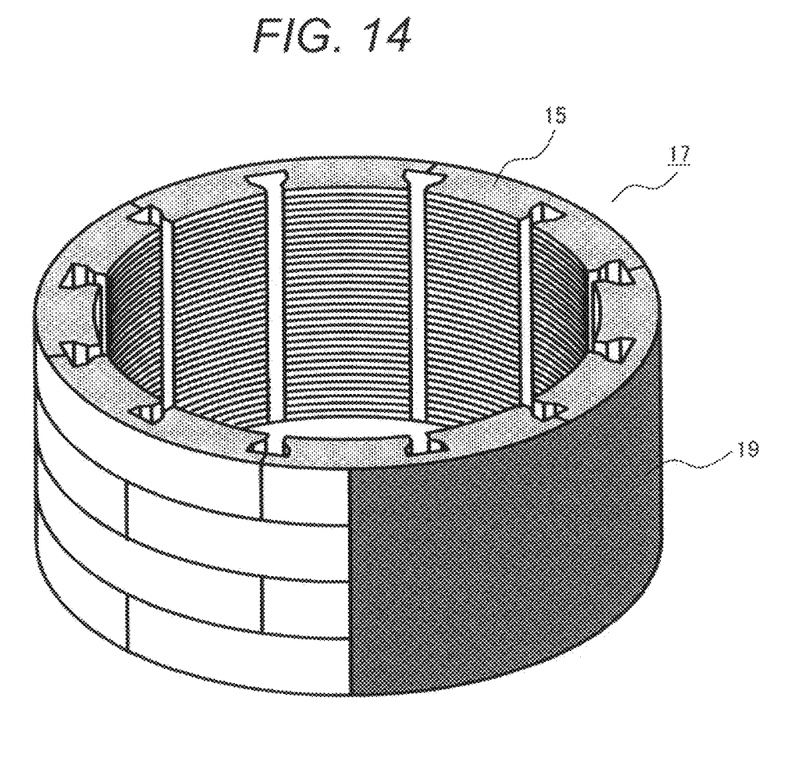
FIG. 14 is a perspective view of a yoke removed teeth from a stator of a rotary electric machine in accordance with a fifth embodiment of the present invention.

FIG. 14 is a perspective view of a stator core shown by separating teeth from a stator of a rotary electric machine in accordance with the fifth embodiment of the present invention. As in FIGS. 12 and 13, a stator 17 has a cylindrical stator core 15 and teeth 16, both of which are divided into six segments in the circumferential direction. The stator 17 is also divided into four segments in the axial direction. Additionally, the four ring-like segments of the stator core 15 are laminated such that the positions where they are divided in the circumferential direction are shifted by 30 degrees from one another. Then the outer circumferential surface of the entire cylindrical stator core 15 is covered with a heat-shrinkable tube 19.

INDUSTRIAL APPLICABILITY

The present invention can be utilized for the assembly of a small and low-load rotary electric machine, especially for the integration of stator cores laminated in the axial direction and/or stator cores segmented in the circumferential direction.

What is claimed is:

1. A rotary electric machine having a stator including a plurality of laminated stator cores laminated in the axial direction, each of the stator cores having a plurality of magnetic poles arranged at predetermined intervals in the circumferential direction, comprising:
   a heat-shrinkable tube covering the outer circumferences of the stator cores; and
   wherein the heat-shrinkable tube covering the outer circumferences of the stator cores has a first heat-shrinkable tube covering the outer circumference of a stator core for one phase, and a second heat-shrinkable tube collectively covering the outer circumferences of stator cores for three phases.

2. The rotary electric machine according to claim 1, wherein a separate said first heat-shrinkable tube collectively covers the outer circumferences of the plurality of laminated stator cores, for each separate stator.

3. The rotary electric machine according to claim 1, wherein the heat-shrinkable tube has a heat shrinkage ratio of 35% or greater in the radial direction.

4. A rotary electric machine having a stator including stator cores laminated in the axial direction, each of the stator cores having a plurality of magnetic poles arranged at predetermined intervals in the circumferential direction, comprising:
   a heat-shrinkable tube covering the outer circumferences of the stator cores;
   unit stators for a plurality of phases, each of the unit stators having:
   many claw poles sticking out in the axial direction, the claw poles being concyclic on each of the stator cores; and
   a stator coil disposed on the outer circumferential side of the many claw poles; and
   a heat-shrinkable tube laminating the unit stators for a plurality of phases such that the electric phases of the magnetic poles are shifted in the axial direction, the heat-shrinkable tube collectively covering the outer circumferences of the stator cores.

5. The claw teeth rotary electric machine according to claim 4, comprising:
   said unit stators each forming one phase, each of the unit stators having:
   a first stator core having many claw poles sticking out from near the inner circumference thereof toward the axial direction and being arranged at predetermined intervals in the circumferential direction, each of the claw poles having a predetermined width;
   a second stator core being identical to the first stator core in shape, the second stator core being disposed such that the second stator core faces the first stator core coaxially, and the many claw poles arranged at intervals are positioned in the intervals between the claw poles on the other side alternately facing each other; and
   a stator coil wound on the outer circumferential side of the many claw poles; and
   wherein said heat-shrinkable tube laminating the unit stators for a plurality of phases such that the electric phases of the magnetic poles are shifted in the axial direction, and said heat-shrinkable tube collectively covering the outer circumferences of the stator cores.

6. The claw teeth rotary electric machine according to claim 5, wherein the first and second stator cores are non-sintered powder compacts formed by compacting magnetic powder.

7. The claw teeth rotary electric machine according to claim 4, further comprising:
   a ring made of rubber resin or nonmagnetic alloy, the ring being disposed between the outer circumference of the many claw poles and the stator coil.

8. The claw teeth rotary electric machine according to claim 5, further comprising:
- a ring made of rubber resin or nonmagnetic alloy, the ring being disposed in contact with the inner circumference of the many claw poles facing each other; and
- a claw-pole heat-shrinkable tube disposed on the outer circumference of the many claw poles.

9. The claw teeth rotary electric machine according to claim 5, further comprising:
- a ring made of rubber resin or nonmagnetic alloy, the ring being disposed in contact with the outer circumference of the many claw poles facing each other; and
- a ring made of shape-memory resin or nonmagnetic shape-memory alloy, the ring being disposed on the inner circumference of the many claw poles.

10. A method for making a stator of a rotary electric machine, comprising:
- stacking two stator core units in the axial direction such that the two stator core units face each other while accommodating a stator coil therein, each of the stator core units having a plurality of magnetic poles arranged at predetermined intervals in the circumferential direction;
- collectively covering the outer circumferences of the two stator core units with a heat-shrinkable tube; and
- applying heat to the heat-shrinkable tube.

11. The method for making a stator of a multi-phase rotary electric machine according to claim 10, wherein the stator core units are single-phase stators, the method comprising:
- stacking the stator cores for multiple phases in the axial direction;
- collectively covering the outer circumferences of the stator cores for multiple phases with a heat-shrinkable tube; and
- applying heat to the heat-shrinkable tube.

12. The method for making a stator of a multi-phase rotary electric machine according to claim 11, comprising:
- cutting the heat-shrinkable tube such that the tube is wider than the width of the outer circumferences of the stator cores for multiple phases;
- covering the outer circumferences of the stator cores with the heat-shrinkable tube such that the tube extends out over both ends of the outer circumferences of the stator cores; and
- applying heat to the heat-shrinkable tube extending out over both ends of the outer circumferences of the stator cores.

* * * * *